United States Patent

Illerhaus

[11] Patent Number: 6,086,504
[45] Date of Patent: Jul. 11, 2000

[54] PLANETARY GEAR AND CLUTCH-BRAKE ARRANGEMENT

[75] Inventor: Dietmar Illerhaus, Lindau, Germany

[73] Assignee: ZF Friedrichshafen AG, Friedrichshafen, Germany

[21] Appl. No.: 09/155,058

[22] PCT Filed: Apr. 22, 1996

[86] PCT No.: PCT/EP96/01675

§ 371 Date: Sep. 17, 1998

§ 102(e) Date: Sep. 17, 1998

[87] PCT Pub. No.: WO97/40290

PCT Pub. Date: Oct. 30, 1997

[51] Int. Cl.[7] .............................. F16H 57/08; F16H 3/44
[52] U.S. Cl. ........................................ 475/347; 475/319
[58] Field of Search .................................. 475/317, 319, 475/320, 331, 346, 347

[56] References Cited

U.S. PATENT DOCUMENTS

| | | | |
|---|---|---|---|
| 2,558,738 | 7/1951 | Davis et al. | 475/319 X |
| 3,097,546 | 7/1963 | Kelbel et al. | 475/319 X |
| 3,131,582 | 5/1964 | Kelbel | 74/788 |
| 3,359,833 | 12/1967 | Flinn | 74/785 |
| 3,669,232 | 6/1972 | Rohweder et al. | 192/85 A |
| 4,680,979 | 7/1987 | Morishita et al. | 475/347 X |
| 5,195,389 | 3/1993 | Isozumi | 475/331 X |
| 5,344,370 | 9/1994 | Luyckx | 475/319 |

FOREIGN PATENT DOCUMENTS

| | | |
|---|---|---|
| 0 692 659 A1 | 1/1996 | European Pat. Off. . |
| 2 259 291 | 8/1975 | France . |
| 1 474 485 | 5/1977 | United Kingdom . |
| 2 093 133 | 8/1982 | United Kingdom . |
| 2 102 515 | 2/1983 | United Kingdom . |

OTHER PUBLICATIONS

*ATZ Automobiltechnische Zeitschrift* 96 (1994) 6 "Stufenloses Automatikgetriebe Ecotronic von ZF", Von Manfred Boos and Wolf–Ekkehard Krieg, pp. 378–384.

*Primary Examiner*—Charles A Marmor
*Assistant Examiner*—Roger Pang
*Attorney, Agent, or Firm*—Davis and Bujold

[57] ABSTRACT

Proposed is a design of a planetary gear (24) and a clutch-brake arrangement, preferably for a CVT (3). Here the ring gear (27) of the planetary gear (24) is integrally designed with a radially mounted buffer disc (30). Further, the end disc (40) and the external disc carrier (36) of the clutch (46) or brake (34) are also integral and of multi-disc design.

2 Claims, 2 Drawing Sheets

PLANETARY GEAR AND CLUTCH-BRAKE ARRANGEMENT

The invention concerns a planetary gear and a clutch-brake arrangement, preferably for a continuously variable automatic transmission.

BACKGROUND OF THE INVENTION

Continuously variable automatic transmissions, hereinafter designated as CVT, consist of the following units: starting unit, forward/reverse drive unit, variator, intermediate shaft and differential. Such CVT's are usually driven by an internal combustion engine, via an input shaft, such as a crankshaft. As starting unit serves either a starting clutch or a hydrodynamic converter. The forward/reverse drive unit serves for the reversal of direction of rotation of the input shaft for the reverse drive. The forward/reverse drive unit is mostly designed as a planetary reversing gear. The latter consists of at least one sun gear, several planets, one ring gear, one brake and one clutch of multi-disc design. The variator consists of two pairs of cone pulleys and one belt. Each pair of cone pulleys, in turn, consists of one first cone pulley half stationary in its axial direction and one second cone pulley movable in axial direction. The belt, such as a thrust link conveyor, extends between the pairs of cone pulley halves. By the adjustment of the second cone pulley half the drive radius of the belt and thus the ratio of the CVT is adjusted.

A CVT, having a forward/reverse driver unit, was made known in the Automobiltechnischen Zeitschrift 96 (1994) 6, page 380, FIG. 3. Here a first shaft driven by the impeller of the hydrodynamic converter drives planetary gears connected by a common first planet spider. Each planetary gear is rotatably mounted upon a stud. On the one hand, the planetary gears mesh with a sun gear located upon a second shaft and, on the other hand, with a ring gear. By a brake of a multi-disc design, the ring gear can be fixed against a stationary wall such as the transmission housing. The second planet spider is connected by a clutch of the multi-disc design with the first cone pulley. When the clutch is closed, the planetary reverse gear revolves as a whole with the ratio of 1 and the same direction of rotation as the first shaft. When the brake is closed, a reversal of direction of rotation for the reverse drive takes place. The gears of the planetary reverse gear are usually helical. Due to the helical teeth of the planet/ring gear, axial forces appear on the ring gear. According to the cited prior art, the ring gear is supported in an axial direction either on the second planet spider connected with the clutch or on the stationary wall.

The problem on which the present invention is based is to further develop a brake having its internal disc carrier connected with a ring gear.

SUMMARY OF THE INVENTION

A first solution of the problem, according to the invention, consists in that a vertically disposed buffer disc is integrally connected with the ring gear. The inner radius of the buffer disc corresponds here substantially to the distance of the central axis of the first shaft to the central axis of the axis. The buffer disc is supported in an axial direction either on a stationary wall or on a first planet spider of the first shaft. The advantage obtained by this arrangement is that the point of support of the ring gear/buffer disc is closer to the central axis of the first shaft. A small peripheral velocity results herefrom. Another advantage consists in that by virtue of said shorter distance of the central axis of the first shaft to the point of support, the piston of the brake can be larger.

In a development of the invention, it is proposed that the buffer disc be supported in a radial direction by a surface on the inner diameter of the buffer disc and a surface of the stationary wall or of a shaft. Contrary to the prior art where the ring gear is exclusively supported by the planets, the advantage obtained hereby is that the ring gear is additionally supported in a radial direction.

A second solution of the problem, according to the invention, consists in that for an arrangement comprising one planetary gear in which the ring gear or the stud upon which the planetary gears are respectively rotatably mounted, may be non-rotatably connected with the internal disc carrier of a clutch or brake of a multi-disc design. The discs of the clutch or brake are here pressed together upon actuation, by a piston against an end disc. The external disc carrier and the end disc are integrally designed. This solution, according to the invention, has the advantage that by virtue of the external disc carrier and of the end disc being integral, the projecting length for the guard ring is eliminated so that the clutch or brake can altogether be shortened. Another advantage consists in that an axial bending of the end disc is effectively prevented so that the load share of the individual disc is improved.

In a development of this, this is proposed that the end disc has a collar radially in direction of the first shaft. Said collar is here at a shorter distance from the first shaft than the central axle of the internal disc carrier from the central axle of the first shaft. The advantage obtained hereby is that the internal disc carrier is protected by the collar against falling during the assembly.

DESCRIPTION OF THE PREFERRED EMBODIMENT(S)

Figure 1:
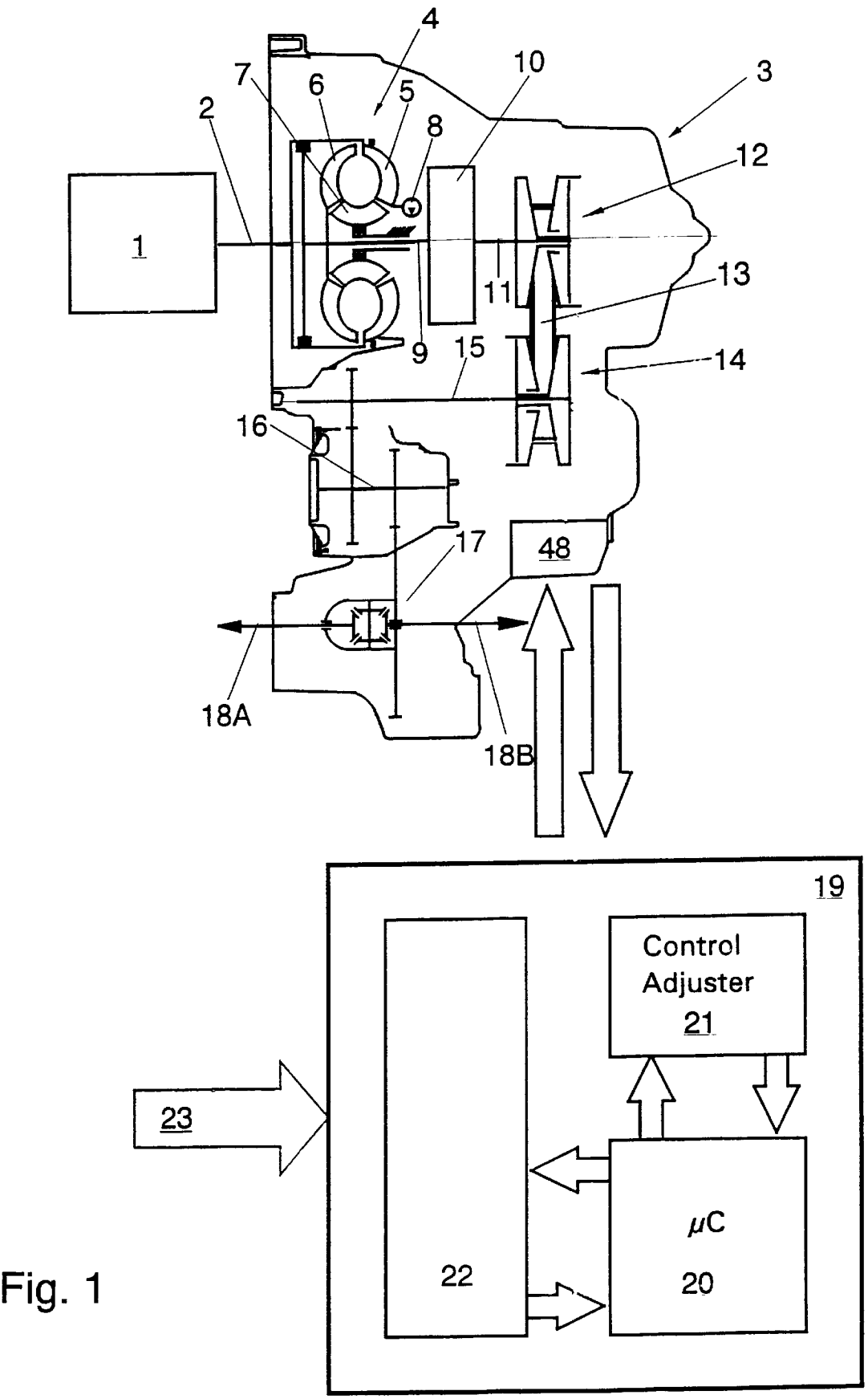
FIG. 1 is a system diagram of a CVT.

FIG. 1 shows a system diagram consisting of an input unit 1, for example, an internal combustion engine, a CVT 3 and an electronic control device 19. The CVT 3 is driven by the input unit 1, via an input shaft 2. The input shaft 2 drives a starting unit. In FIG. 1, the starting unit is a hydrodynamic converter 4. The hydrodynamic converter 4, as already known, consists of an impeller 5, turbine 6 and a stator 7. Parallel to the hydrodynamic converter is shown, without reference numeral, a converter bridge clutch. A pump 8 is connected with the impeller 5 of the hydrodynamic converter 4. The pump 8 conveys hydraulic medium from the lubricant sump to the adjusters of the CVT 3. The turbine 6 and the converter bridge clutch drive a first shaft 9. The shaft 9, in turn, drives a forward/reverse drive unit 10. The output of the forward/reverse drive unit is a second shaft 11. The second shaft 11 is connected with the variator. The variator consists of a first pulley cone pair 12, a second pulley cone pair 14 and a belt 13. The belt organ 13 extends between the two pulley cone pairs 12 and 14. As known per se, each pulley cone pair consists of a first pulley cone stationary in an axial direction and a second pulley cone movable in the axial direction. The ratio of the variator is changed by changing the position of the movable second pulley cones. Thereby is changed, as known per se, the moving radius of the belt 13 and thus the ratio. The variator is connected with an output shaft 15. An intermediate shaft 16 is connected with the output shaft 15 by a pair of gears. The intermediate shaft 16 serves for the reversal of direction of rotation and a change of torque and speed. The intermediate shaft 16 is connected with differential 17 by a pair of gears. Output variables of the differential 17 are the two axle half shafts 18A and 18B which lead to the input gears of the vehicle. The electronic control device 19 controls the CVT 3, via electromagnetic adjusters not shown. The electronic control device 19 is shown as function blocks comprising micro-controller 20, a function block calculation 22 and a function block control adjuster 21. To the electronic control device 19 are connected input variables 23. Input variables 23 are, for example, the signal of a throttle valve, the signal of the speed of the input unit, the signal of the vehicle velocity and the speed signal of the cone pulley pairs. The micro-controller 22 calculates, by means of the function block 22, from the input variables 23, the function parameters for the CVT 3. These are adjusted by means of the function block control adjusters 21 and via the electromagnetic adjusters not shown, which are located in the hydraulic control device 48 of the CVT 3. Function parameters of the CVT 3 are, for example, the ratio and the contact pressure of the second cone pulley to the belt 13.

Figure 2:
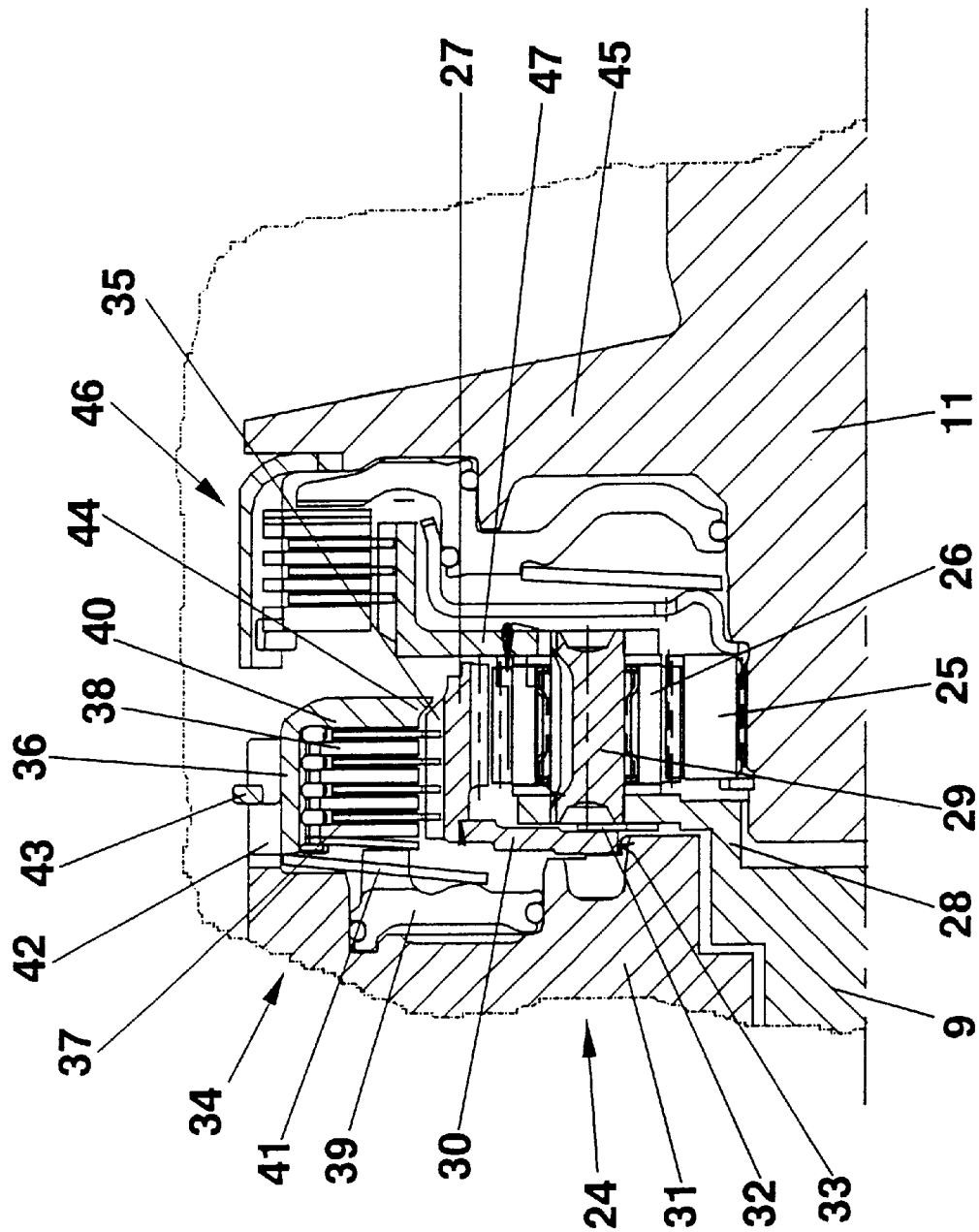
FIG. 2 is a forward/reverse drive unit.

In FIG. 2 is shown a section of the forward/reverse drive unit 10 of FIG. 1. It essentially consists of a first shaft 9, a second shaft 11, a planetary gear 24, a brake 34 and a clutch 46. A first pulley cone 45 is integrally designed with the second shaft 11. The planetary gear 24 is composed of a sun gear 25, several planetary gears 26 and a ring gear 27. Each of the planetary gears 26 is rotatably supported upon a stud 29. The planetary gears 26 are driven, via a common first planet spider 28, the first planet spider 28 is integral with the first shaft 9. A second planet spider 47 leads to the internal disc carrier of the clutch 46. The first and second planetary carriers can be integral. Both planet spiders can be shaped, for example, as shaped sheet parts and be integrally interconnected by shaped links. The ring gear 27 is connected with an internal disc carrier 35 of the brake 34. The brake 34 is composed of the internal disc carrier 35, the internal discs 37, external discs 38, external disc carrier 36, end disc 40, guard ring 43, toothing 42, piston 39 with resetting device 41. A plate spring is shown as the resetting device 41. The teeth of the planetary gear 24 are helical. The ring gear 27 is integrally connected with a buffer disc 30. The ring gear 27 is thus supported by the buffer disc 30 either on a stationary wall 31 or on the first planet spider 28. In forward drive, there is no speed difference between the ring gear 27 and the first planet spider 28. Only in the reverse drive range with a share of 0.5% is there a speed difference between said two parts. As shown in FIG. 2, between the buffer disc 30 and the first planet spider 28 there is an additional disc 32. The buffer disc 30 is supported in a radial direction on a surface 33 of the stationary wall 31. Instead of the stationary wall 31, there can also be considered, as a support, a rotary part, shaft, or the like. Thereby the ring gear 27 is fixed in radial direction for support by the planets. The buffer disc 30 can likewise be radially supported by means of a bearing arrangement such as ball bearings.

The clutch 46 or the brake 34 serves the forward/reverse shift. When the clutch 46 is closed, the planetary gear 24 revolves as one whole. The pulley cone 45 and the second shaft 11 thus rotates at the same speed and in the same direction of rotation as the first shaft 9. When the brake 34 is engaged, the planetary gears 26 roll on the fixed ring gear 27 and drive the sun 25 with a reversal of the direction of rotation. Both clutch 46 and brake 34 are of a multi-disc design. The clutch 46 is a design, according to the prior art, in which one end disc is secured against axial movement by a guard ring in the external disc carrier. The brake 34 shows a solution, according to the invention, in which the external disc carrier 36 and the end disc 40 are integrally designed. The advantage obtained thereby is that the brake can be shorter, since the projecting length of the guard ring is eliminated. In addition, axial bending of the end disc is reduced whereby the load share of the individual disc is improved. The end disc 40 has a collar 44. Said collar extends closer to the axis of the first shaft 9 than the exterior of the internal disc carrier 35. This collar prevents the dropping of the internal disc carrier during the assembly. The external disc carrier 36 is connected by teeth 42 with the stationary wall 31. Situated thereon as axial protection is the guard ring 42. Both solutions, according to the invention, can be used in any planetary gear and any planetary gear with clutch/brake arrangement.

| Reference numerals | |
| --- | --- |
| 1 input unit | 23 input variables |
| 2 input shaft | 24 planetary gear |
| 3 CVT | 25 sun gear |
| 4 hydrodynamic converter + converter bridge clutch | 26 planetary gears |
| | 27 ring gear |
| | 28 first planet spider |
| 5 impeller | 29 stud |
| 6 turbine | 30 buffer disc |
| 7 stator | 31 stationary wall |
| 8 pump | 32 disc |
| 9 first shaft | 33 surface |
| 10 forward/reverse drive unit | 34 brake |
| | 35 internal disc carrier |
| 11 second shaft | 36 external disc carrier |
| 12 first pulley cone pair | 37 internal discs |
| 13 belt | 38 external discs |
| 14 second pulley cone pair | 39 piston |
| 15 output shaft | 40 end disc |
| 16 intermediate shaft | 31 resetting device |
| 17 differential | 42 teeth |
| 18A gear output shaft | 43 guard ring |
| 18B gear output shaft | 44 collar |
| 19 electronic control device | 45 first pulley cone |
| | 46 clutch |
| 20 micro-controller | 47 second planet spider |
| 21 function block control adjuster | 48 hydraulic control device |
| 22 function block calculation | |

What is claimed is:

1. An arrangement comprising a first shaft (9) and a planetary gear arrangement (24) which comprises at least one sun gear (25), several planetary gears (26) supported by a planetary gear carrier and at least one ring gear (27), wherein:

a) said planetary gears (26) are each rotatably supported on a respective stud (29), b) each said stud (29) is supported by a first and second planet spiders (28, 47) with which said studs (29) and said first and second planet spiders (28, 47) jointly form the planetary gear carrier, c) said planetary gears (26) engage both said sun gear (25) and said ring gear (27), d) said first shaft (9) drives said first planet spider (28), e) said ring gear (27) supports an internal brake multi-disc carrier (35) of a brake (34). and said stud (29) supports an internal clutch multi-disc carrier of a clutch (46), f) said clutch (46) and said brake (34), each consist of said internal disc carrier and an external disc carrier, g) internal discs are coordinated with said internal disc carrier and external discs with said external disc carrier, h) said internal discs and said external discs are movable in an axial direction and selectively connected with said internal and external disc carriers, i) said clutch (46) and said brake (34) are each engaged by a piston pressing said external and internal discs against an end disc which is an external disc, j) said clutch (46) and said brake (34) are each disengaged by said piston being returned to an initial position by a resetting devices, and k) said external carrier (36) of brake (34) has teeth (42) on an external periphery thereof, l) said external disc carrier (36) is fixed circumferentially by said teeth (42) and fixed in an axial direction, by a guard ring (43), and m) an end disc (40) of said brake (34) has a collar (44) extending radially toward said first shaft (9), and said collar (44) is closer to said first shaft (9) than an exterior surface of said internal disc carrier (35) of said brake (34).

2. An arrangement according to claim 1, wherein said first and second planet spiders (28, 47) are shaped sheet parts so and are integrally interconnected by shaped links.

\* \* \* \* \*